United States Patent [19]

Le Paillier

[11] Patent Number: 4,968,855

[45] Date of Patent: Nov. 6, 1990

[54] DISTRIBUTION SLAB FOR WIRING BUILDINGS, AND A METHOD OF WIRING AN ASSEMBLY OF SLABS

[76] Inventor: Patrick Le Paillier, 6, rue Gabrielle, 92140 Clamart, France

[21] Appl. No.: 266,641

[22] Filed: Nov. 3, 1988

[30] Foreign Application Priority Data

Nov. 10, 1987 [FR] France ................................ 87 15538

[51] Int. Cl.⁵ ............................................. H02G 3/28
[52] U.S. Cl. ........................................ 174/48; 52/221; 52/263
[58] Field of Search .............. 174/48, 49, 67; 52/220, 52/221, 263

[56] References Cited

U.S. PATENT DOCUMENTS

| | | | |
|---|---|---|---|
| 3,549,781 | 12/1970 | Jones | 174/49 |
| 4,016,357 | 4/1977 | Abrahamsen | 174/48 |
| 4,070,078 | 1/1978 | Chrones | 174/67 X |
| 4,652,696 | 3/1987 | Winnick | 174/67 |
| 4,773,196 | 9/1988 | Yoshida et al. | 52/220 X |

Primary Examiner—Leo P. Picard
Assistant Examiner—David A. Tone
Attorney, Agent, or Firm—Joseph S. Iandiorio; Brian M. Dingman

[57] ABSTRACT

A floor distribution slab comprises a base (1) and a plane lid. The base (1) is constituted by a base plate (11) having spacers (12, 13) upstanding thereon, together with the sides (16) of a connection housing (17). The spacers and advantageously the sides (16) of the housing (17) support the lid and keep it at a distance from the base plate (11). The sides of the housing (17) include at least one opening for passing cables. The housing (17) is provided to receive a fixing block (22) for connection (electricity outlets, telephone sockets, computer connectors, etc.). The lid of a slab fitted with a block (22) includes an opening for uncovering the block. A slab in accordance with the invention can be used for disposing connection scheme in any location in a given area. It also enables the connection to be displaced without difficulty. Further, it is cheap to manufacture and easy to lay.

21 Claims, 6 Drawing Sheets

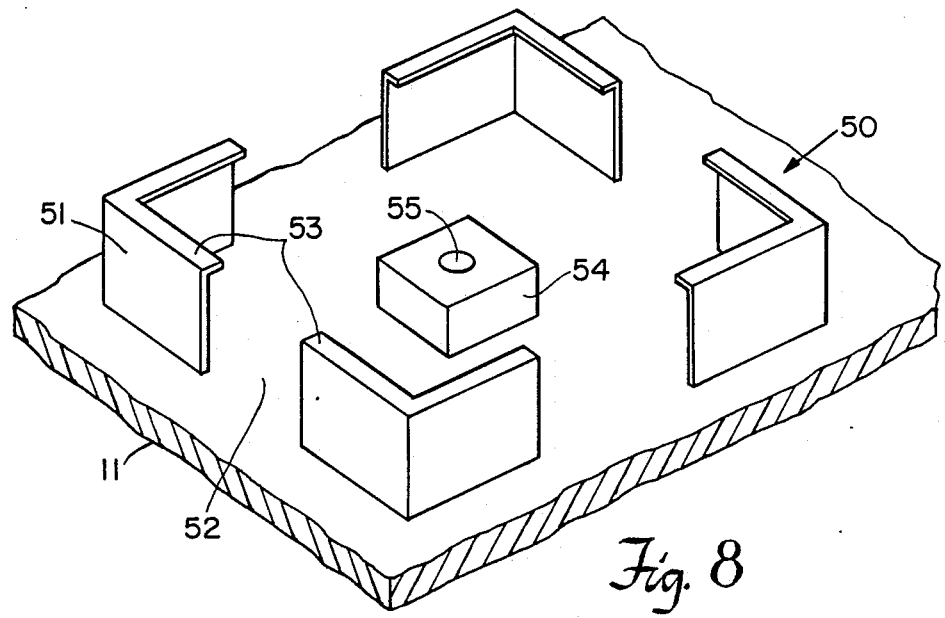
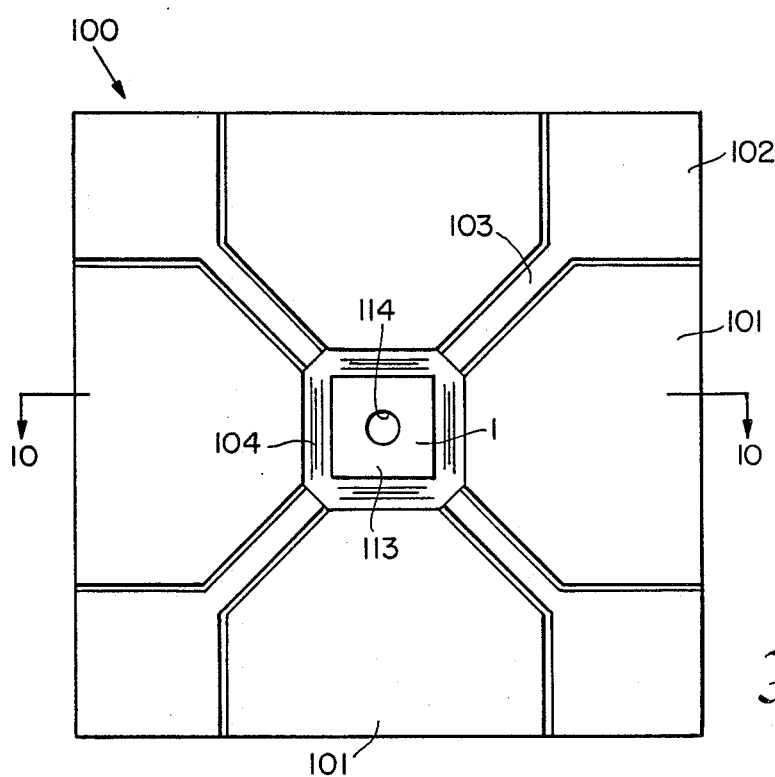

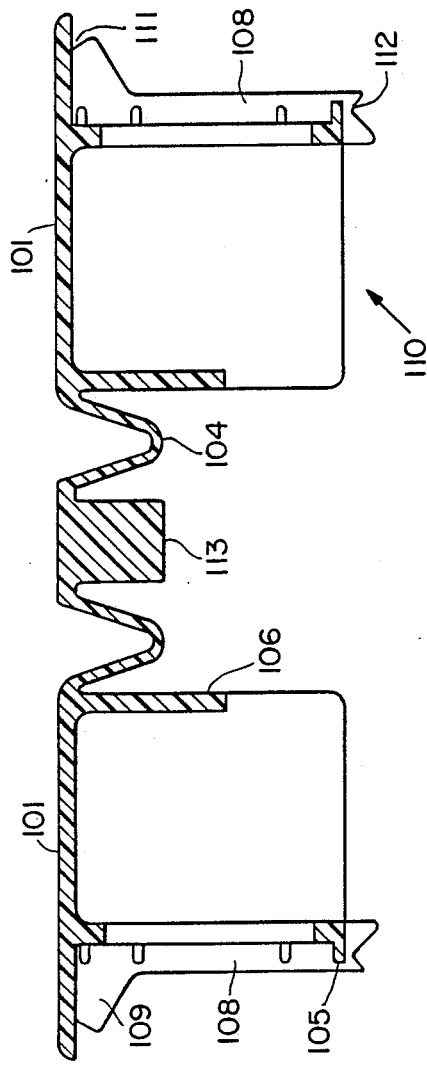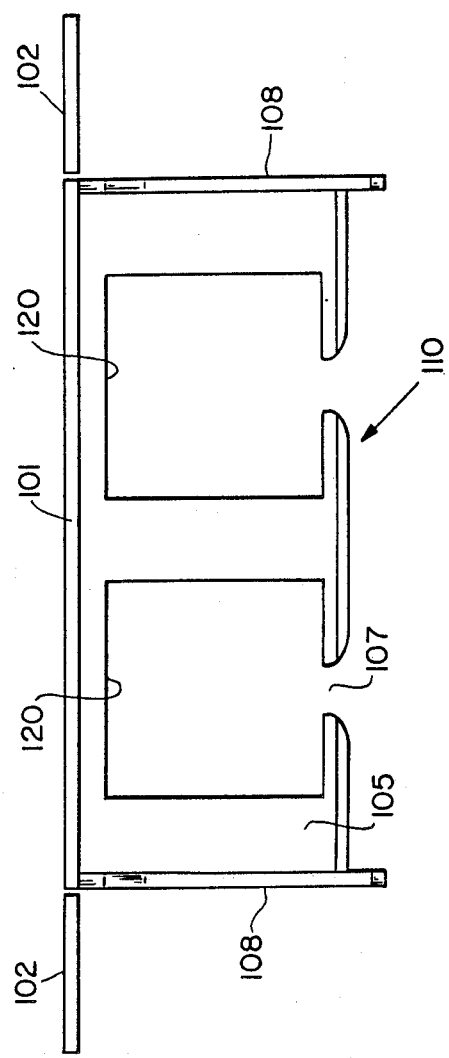

DISTRIBUTION SLAB FOR WIRING BUILDINGS, AND A METHOD OF WIRING AN ASSEMBLY OF SLABS

The present invention provides a distribution slab for wiring buildings, and a method of wiring an assembly of slabs.

BACKGROUND OF THE INVENTION

The object of the present invention is to solve the problem posed by wiring premises in which it is necessary to provide connection means connected to various circuits and networks such as a power supply circuit (mains), a telephone network, a computer network, etc. with said means being provided at various different points whose positions are liable to change. The invention is therefore not restricted to one particular type of premises and can satisfy a need which exists both in buildings intended for residential purposes and in buildings for professional use (offices, exhibition halls, etc.). This second type of building is referred to specifically below, by way of example, with particular mention being made of office buildings in which floor area is subdivided into work station areas with each work station requiring various accessories such as a lamp, telephone set(s), a computer terminal, a microcomputer, various office machines (typewriter, calculator), etc., in order to be able to function.

In order to optimize utilization of the available floor area in office buildings subdivided in this way into work station areas, and in particular in order to be able to keep up with changes in the working environment both with respect to personnel and with respect to equipment (changing the quantity and/or the quality of the employees using given offices, changes in technology giving rise to machines being replaced by more modern machines, etc.), it is necessary to be able to set up, and above all to change, the positions of work stations within the available area, i.e. it must be possible to move the various connection means associated with each work station, and also, possibly, to be able to install new connection means.

In a volume delimited by a floor, a ceiling, and by walls or partitions, there exist three possible locations for passing cables (metallic cables or optical cables) for connection to the connection means (electricity power points, computer connectors, telephone sockets, etc.) as required by the (or each) work station occupying said volume: namely the floor, the ceiling, and the walls. In practice, all three possibilities are made use of and they give rise to various different types of installation which are summarized briefly below.

When cables are passed in a false ceiling, they are extended to the level of the connection means for each work station (which means must be readily accessible) by hollow posts which generally extend between said false ceiling and the floor. The advantage of this type of installation is that it makes it possible to serve any location, in particular without regard to its position relative to the vertical walls. However, it is not easy to reconfigure, it occupies considerable space, and it requires its own special housing structure (false ceiling, posts, . . . ).

At floor level, there are various different ways and manners of passing cables.

If the cables are flat, they may be placed beneath a floor covering (e.g. carpet) and connected to connection means at the location of each work station. An installation of this type can serve any location, occupies very little space, and does not require its own special housing structure. However, reconfiguration is difficult since the floor covering must be lifted and new cables must then be laid.

If the cables are conventional in form (i.e. round) they may be laid beneath a load-bearing surface situated at a distance from the underlying floor (the layer of concrete between two floors of a building, for example). This load-bearing surface may be constituted by rigid slabs each standing on the underlying floor by means of legs of adjustable height disposed at their corners. Such slabs are known as "computer slabs" because they were originally designed for installation in rooms intended specifically to contain computer equipment. Computer slabs are advantageous in that they enable any location in premises equipped with them to be served and it is easy to reconfigure the cable networks underneath them: in order to gain access to any one of such networks, it is necessary to lift only a small number of slabs running along the old path of the network in question and also along its new path. Enough space is left free between the supporting legs to ensure that a link between one point and another can run directly or neatly directly. However, the cost of installations of this type limits their use to premises where they are absolutely necessary.

Round section cables can also be laid in a grid of channels constituted by assembling flexible plates on the ground, which plates are several centimeters thick and contain portions of perpendicular channels, such that juxtaposing a plurality of plates constitutes said grid of channels. The projecting portions of these plates which occupy the major portion of their area, include peripheral shoulders for receiving channel covers in the form of removable strong thin lid plates. The ground plates together with their lids present a plane surface which is normally covered with a floor covering (carpet, linoleum squares, etc.). Such an installation occupies little room and makes it possible to serve practically any point within a given space. However, it is fairly expensive and is not as easily reconfigured as an installation where cable networks are received beneath computer slabs.

The third possible location for passing cables in a given premises, other than the ceiling and the floor, is constituted by the surrounding walls or vertical partitions. In conventional manner, each room or partitioned-off area is surrounded, at floor level, by a flat sheath which also acts as a skirting board. The sheath is constituted by an elongate housing with a flat lid and it contains guides enabling several series of cables to be disposed one above the other. Connection means such as sockets or outlets are provided for snap-fastening to any point along the elongate housing. Between any two non-contiguous outlets the housing is closed by a portion of lid which is cut to the appropriate length. When it is desired to change the location of an outlet or a group of outlets, it suffices merely to remove the lid from the sheath over the appropriate length, to undo the snap-fastening of said outlet or group of outlets, and then to snap-fasten it in the new location The sheath is then closed again by cutting lid material to length, as required. Such an installation has the advantage of being easy to install and to reconfigure. However, it is suitable only for relatively small premises where the stands for supporting the equipment served by the hollow skirting board are located close to said skirting.

Connections between the skirting and the equipment it serves are made by loose connection cables and it is important that such cables should not cross the path of people walking about.

All of the types of installation and equipment for providing such installations as described briefly above thus have various combinations of advantages and drawbacks. The object of the present invention is to provide an installation for distributing wiring in buildings which retains the advantages of prior installations while mitigating their drawbacks

SUMMARY OF THE INVENTION

The present invention provides a distribution slab for wiring buildings, wherein the slab comprises a base and a lid (which are generally rectangular), said base comprising a plane base plate from which there project:

at least four spacers for supporting said lid and holding it away from the plane plate; and the sides of a connection housing, with at least one of said sides including an opening for passing cables, said connection housing being provided to receive connection means. Advantageously, the sides of the connection housing have the same height as the spacers. The connection housing may contain a fixing block for the connection means.

The plane base plate may include a stud projecting from the center of the connection housing for the purpose of supporting a block on which the connection means are fixed. The connection housing may itself be disposed in the middle of the base plate. One of the spacers or possibly a stud on the connection housing may have a bore for receiving the end of an anchor rod.

A fixing block for the connection means may include at least one hatch constituting a flap which is hinged to a junction body and which is connected to a retractable support member for the connection means. The support member may be a frame extending substantially perpendicularly to the flap and including at least one opening for receiving the connection means. Each hatch advantageously includes two locking means which serve to hold it respectively in an open position and in a closed position.

The invention also provides a method of wiring an assembly of hollow slabs each including an internal housing, with the housing of one of said slabs containing connection means suitable for connection to at least one cable, said method consisting in winding down the cable(s) in the form of at least one turn around the housing of a slab which is contiguous to the slab containing said connection means, and subsequently connecting said cable(s) to said connection means, with different cables being wound down in different slabs.

BRIEF DESCRIPTION OF THE DRAWINGS

Implementations of the invention are described by way of example with reference to the accompanying drawings, in which:

FIG. 8 is a diagrammatic perspective view of a particular embodiment of a connection housing for a slab in accordance with the invention;

FIG. 9 is a plan view of an embodiment of a block suitable to the FIG. 8 housing;

FIG. 10 is a section through the FIG. 9 block on the line 10—10;

FIG. 11 is a side view of the block shown in FIGS. 9 and 10;

MORE DETAILED DESCRIPTION

Figure 1:
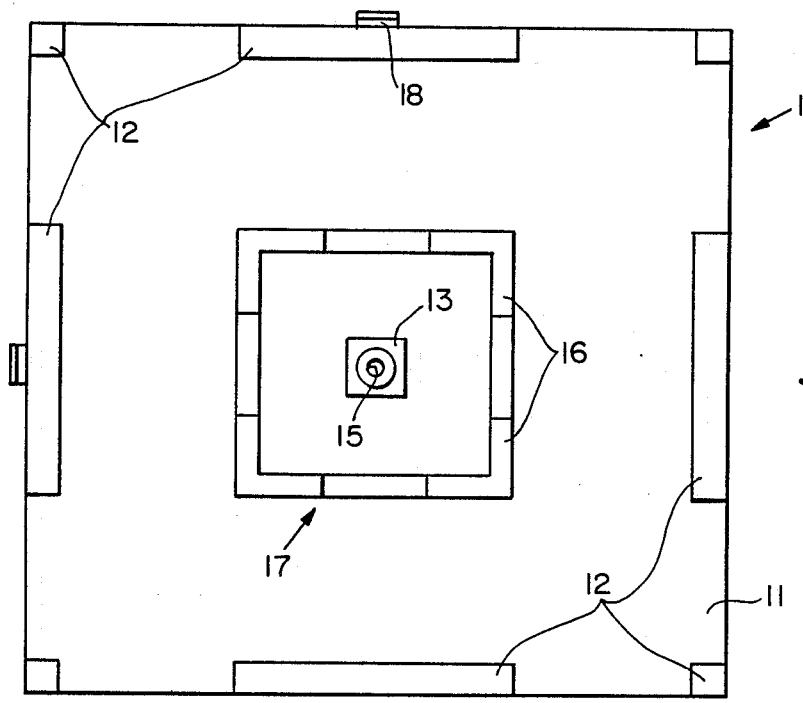
FIG. 1 is a plan view of the base of a first type of slab in with the invention.

As can be seen in FIGS. 1 to 5, a distribution slab for wiring buildings in accordance with the invention essentially comprises a base 1 and a lid 2 or 3, which base and lid are rectangular, and advantageously square. The base 1, shown particular in FIG. 1, comprises a plate 1 provided with spacers 12 around its periphery which project upwardly and which are intended to serve as bearing points for a lid. These peripheral spacers are, for example, disposed at the corners of the plate and in the middles of all of its sides. The base 11 also includes a center stud 13 provided with a shoulder 14 at its top end and pierced by a bore 15 which also passes through the plate 11. The shoulder 14 engages and retains a support block for the connection means, as described below. The stud 13 may also serve as a spacer. The bore 15 is not essential to the operation of the slab as a distribution slab, but it is intended to receive the end of an anchor rod for enabling items of furniture, partitions, display panels, etc. to be fixed to the ground. Four bracket-shaped spacers 16 project upwardly around the central stud 13 forming four open sides of a first type of rectangular housing 17 (which is square in the figures). Advantageously, the bracket-shaped spacers 16 have the same height as the peripheral spacers 12 and also serve to support the lid of the slab. The portion of the plate 11 constituting the bottom of the housing 17 may be of reduced thickness (as shown in the figures) so as to enable said housing to have a greater volume. The base 1 also includes rapid fixing means on its sides, said means are advantageously snap-fastening means for connecting each slab to the surrounding slabs. These fixing means may be constituted by a latching finger 18 for engaging in a slot 19 of complementarY shape.

Figure 2:
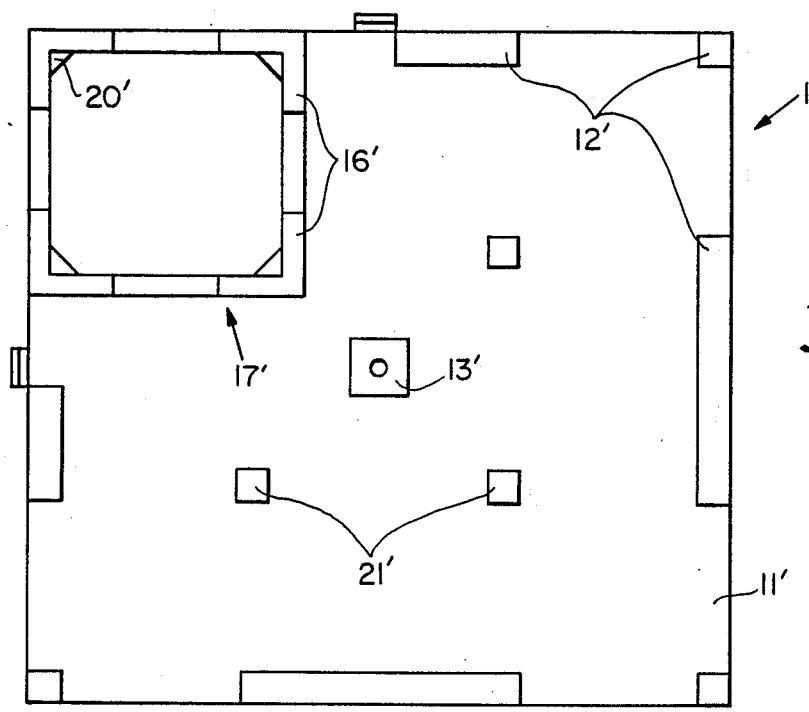
FIG. 2 is a plan view of the base of a second type of slab in accordance with the invention.
Figure 3:
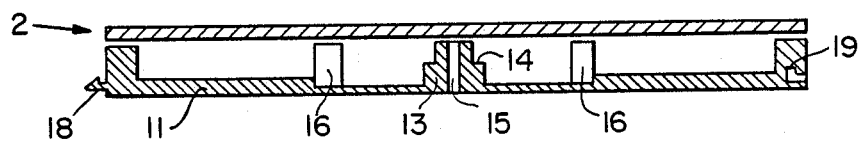
FIG. 3 is a section view on one of the midlines of a slab whose base is shown in FIG. 1, which slab is fitted with a first type of lid.

The positioning of the spacers 12 and 16, and their total support area may be varied. By way of example, FIG. 2 shows the base 1' of a slab or housing 17' constituted by four bracket-shaped spacers 16' in one of the corners of the plate 11'. Three of the spacers 16' thus include at least a portion at the periphery of the plate 11'. A triangle 20' is disposed in the corner of each bracket-shaped spacer at a distance above the plate 11′ for the purpose of supporting the corner of a block described below. In order to ensure that the lid for covering the base 1′ is supported uniformly, the base plate 11′ includes a central spacer 13′ surrounded by three additional spacers 21′ in addition to its peripheral spacers 12′.

The total support area of the spacers depends both on the strengths of the lids that they are intended to support and on the load that will be applied to them. In practice, since it is desirable for the slabs to have an inside volume which is as large as possible, a small number of spacers is used giving rise to a minimum total support area, and depending on user requirements, lids are used of greater or lesser strength per unit area. The slab base 1 shown in FIG. 1 shows one example of the ratio that may be provided between the total area of the base and the support area of the spacers, for a slab whose dimensions are approximately $0.6 \, m \times 0.6 \, m \times 0.05 \, m$ (where "m" stands for "meters").

Figure 4:
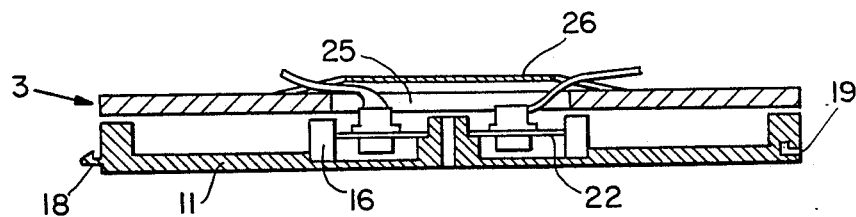
FIG. 4 is a section view on one of the midlines of a slab whose base is shown in FIG. 1, which slab is fitted with its connection means and with a second type of lid.
Figure 5:
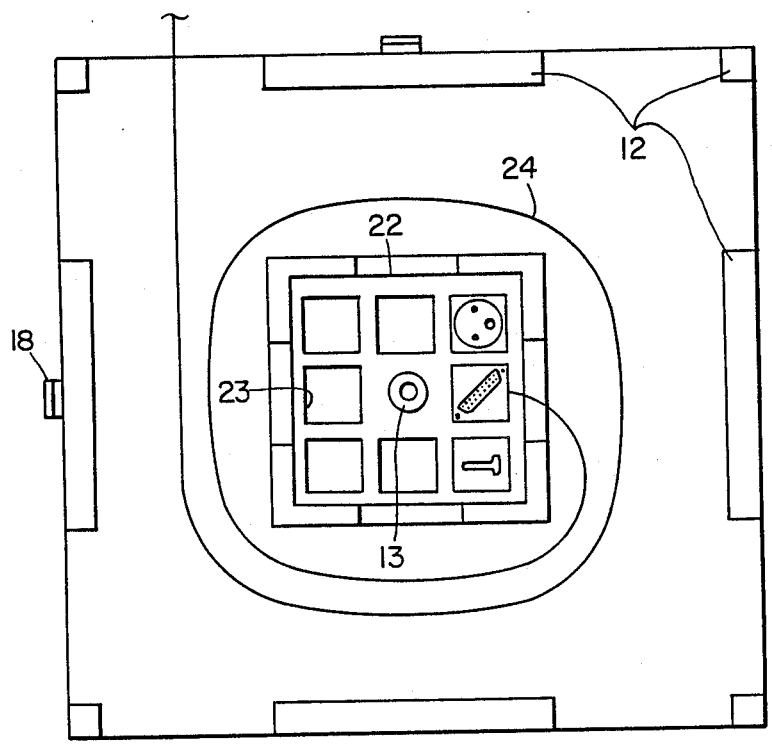
FIG. 5 is a plan view of the base of the slab shown in FIG. 1, equipped with connection means.

As can be seen clearly in FIGS. 4 and 5, the base 1 of a slab in accordance with the invention may be provided with a first type of block 22 for supporting various connection means. This block is designed to be received inside the housing 17 and is essentially constituted by a plate having incompletely-separated cut-outs 23 of the same size as standard connection means. It is pierced in the middle by an opening whose shape and size correspond to the top end of the central stud 13. As a result, the block 22 is held at a distance from the bottom of the housing 17, i.e. from the reduced-thickness portion of the plate 11 by means of the shoulder 14 on which it is supported. In FIG. 5, three of the eight cut-outs in the block (which number is arbitrarily) have been removed and the corresponding openings respectively receive three different connection means (one power outlet, one computer connector, and one telephone socket). The cables 24 connected to the connection means (only one cable shown in the figure), enter the housing 17 via the sides of said housing, where the disposition of the bracket-shaped spacers 16 leave passages for this purpose.

Depending on whether or not a block 22 is housed therein, the base 1 of the slab is closed either by a lid 2 constituted by a simple plate (FIG. 3) or else by a lid 3 constituted by a plate having a central opening over an area which is substantially equal to the area of the bottom of the housing 17 (FIG. 4). In this case, the opening 25 through the lid 3 which is provided to give access to the connection means, may itself be closed by a protective cap 26.

FIG. 8 shows one particular embodiment of a connection housing for a slab in accordance with the invention. This housing is given an overall reference numeral 50 and is intended to contain one particularly advantageous embodiment of the fixing block for the connection means as described below. The housing 50 is square and has four rectangular sides 51 projecting at right angles from the base plate 11 of a slab. Each of the sides 51 is interrupted by an opening 52 which extends along its entire height and is intended to pass cables. The sides 51 are also provided at their top edges with lips 53 whose function is described below. In the middle of the housing 50 there is a stud 54 which supports the middle portion of a block when the housing contains a block. The stud 54 is constituted by a volume which is simple in shape, e.g. a rectangular parallelepiped, and its height is less than that of the sides 51. It is pierced in its center by a bore 55 for receiving an anchor rod.

A block 100 suitable for being received in the FIG. 8 housing is shown in FIGS. 9 to 12. Seen from above, this block is square in shape being divided into eight zones which are regularly disposed around a central portion which is likewise square. The pattern defined by the outline of these zones constitutes a cross having pentagonal arms (of area greater than the portions of hatches 110 that are referred to below as flaps 101) which are separated by complementary portions constituting a square 102 in each of the corners of the block and connected to the central portion by rectilinear rods 103. This design thus has four axes of symmetry (the midlines and the diagonals of the square as seen when the block 100 is looked at from above).

The central portion of the block comprises a junction body 113 (see FIG. 10) which projects inwardly and which is intended to rest on a stud 54 in a housing 50. This solid piece is pierced by a hole 114 corresponding to the hole 55 in the stud 54 and is intended for the same purpose.

The complementary portions (102, 103) are plane, they occupy the same plane as the central square, and they remain therein. In contrast, the flaps 101 which constitute the plane tops of respective complex assemblies are themselves connected to the central square forming the top surface of the junction body 113 by means of respective hinges 104. The flaps can thus leave the plane defined by the complementary portions 102 and 103 while said complementary portions remain fixed. This is done by pivoting the flaps about their respective hinges. Each hinge 104 is constituted by a trough of flexible resilient material which is generally V-shaped in cross-section. The term "hatch" 110 is used below to designate each of the four complex assemblies whose respective top surfaces are constituted by the flaps 101.

Figure 12:
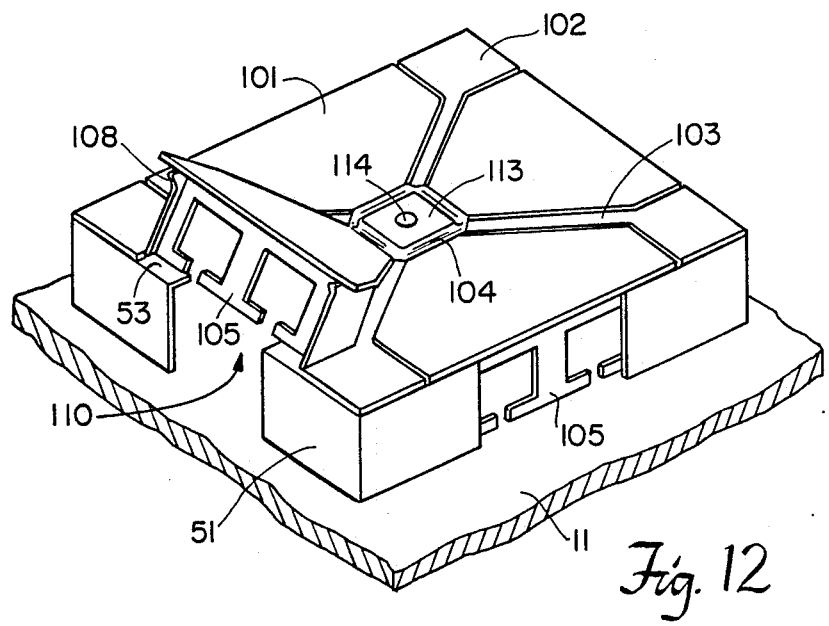
FIG. 12 is a diagrammatic perspective view of the block shown in FIGS. 9 to 11 and received in the housing of FIG. 8.

As can be seen in FIGS. 10, 11, and 12, each hatch 110 comprises a plane top constituted by a flap 101 and a support frame 105 extending perpendicularly thereto and intended to receive the connection means. Each support frame 105 is fixed in a position set back from the outside edge of its flap 101. The assembly is stiffened by means of a plate 106 extending perpendicularly both to the flap 101 and to the frame 105 and serving to divide the hatch into two equal compartments.

The frame 105 has two rectangular openings 120 provided for receiving the connection means. In addition, the frame 105 is slotted at the base of each of the openings 106 by respective openings 107 provided to pass the cables connected to the connection means. The frame 105 is stiffened at its side edges by two parallel ribs 108. The ribs 108 do not serve solely to stiffen the frame 105. They are shaped so as to cooperate with the lip 53 of a housing 50 and with a hinge 104 in order to constitute a device for locking the corresponding hatch in each of two positions, namely a closed position and an open position.

The profile of the ribs 108 can be seen clearly in FIG. 10. Each rib 108 has a nose 109 at its top end which defines a first notch 111 in conjunction with the flap 101. The bottom end of each rib includes a second notch 112. The lip 53 on one of the sides 51 of a housing 50 engages in the notch 111 or the notch 112 depending on whether the hatch 110 is in its closed position or in its open position. The lip 53 remains engaged in the notch 111 or 112 by virtue of the hinge 104 which is shaped so as to act not only as a hinge but also as a spring urging the hatch 110 away from the middle of the block.

The above-described block 100 can be molded as a single piece of plastic material. It is therefore very cheap to manufacture. It also has the advantage of being very flexible in use and of providing effective protection for the connection means it receives.

Figure 13:
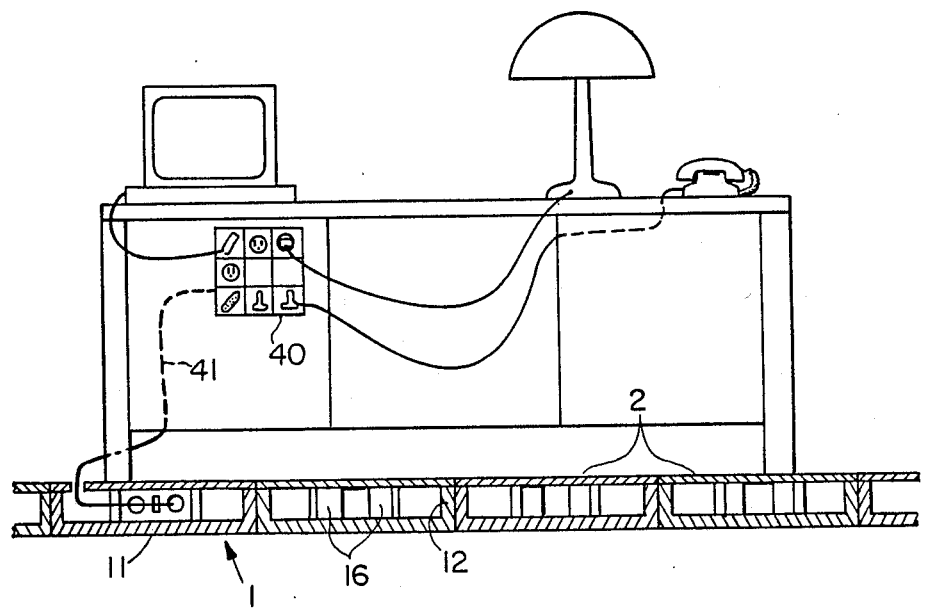
FIG. 13 is a diagrammatic section view through slabs in accordance with the invention, with one of the slabs being connected to a connection box in accordance with the invention.

In a variant of the invention, shown in FIG. 13, the supply slab (1, 2) containing all the connection means required for a work station does not include a fixing block for the connection means to which the work station equipment can be directly connected. The connection means are enclosed inside the slab and are not accessible. In order to serve the various electrical and/or electronic machines required for operation of the work station (in this case a microcomputer, a lamp, and a telephone set), a connection box 40 is used containing multiple connection means connected by a bundle of loose cables 41 to the connection means contained in the supply slab, with the free end of the bundle of cables 41 being provided with appropriate connection means. The connection box 40 may be fixed to an item of furniture, as shown in the figure, or it may be fixed directly to the ground, for example. Advantageously, it is mass produced to a standard design. When such a connection box 40 is used, the lid 2 of the supply slab is a simple plate which is pierced by a hole for passing the bundle of cables 41.

Figure 6:
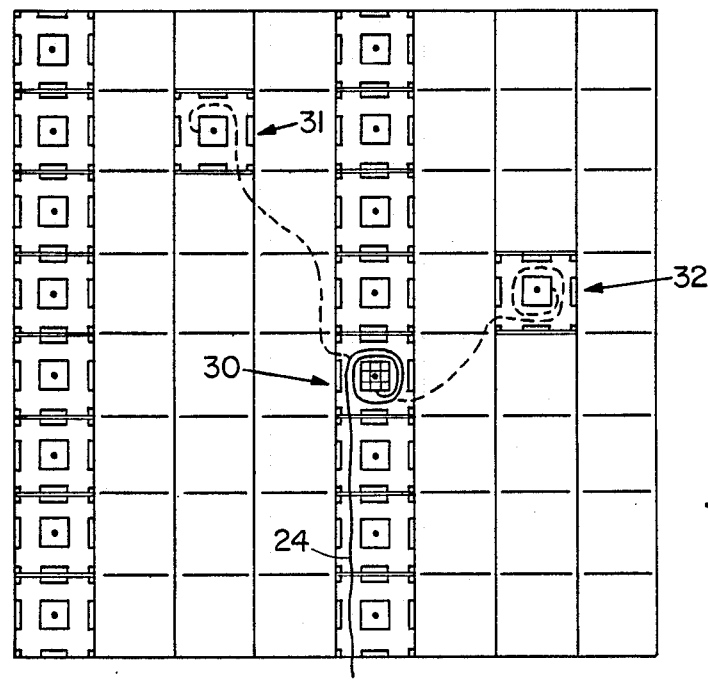
FIG. 6 is a plan view of a work station area fitted with slabs in accordance with the invention (with some of the slabs being shown without their lids), illustrating an advantage of the invention.
Figure 7:
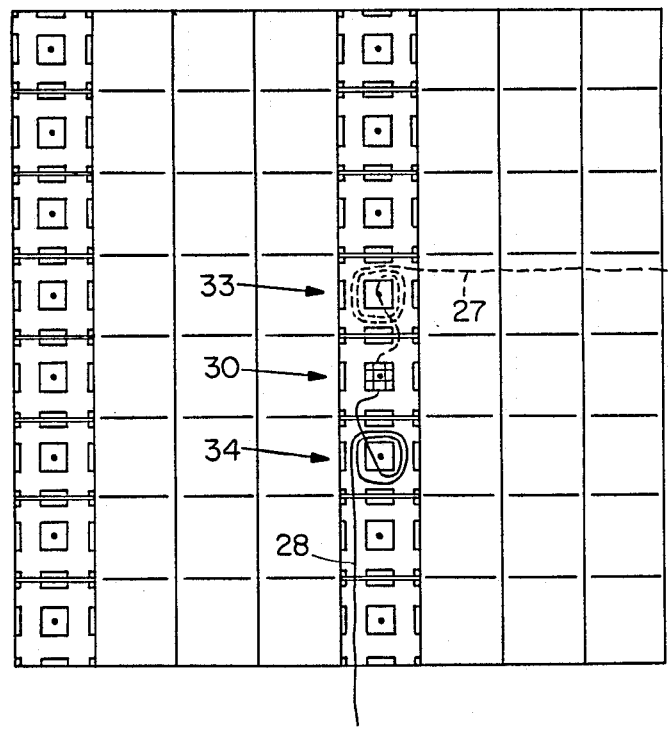
FIG. 7 is a plan view of a work station area equipped with slabs in with the invention (some of which are shown without their lids), illustrating another advantage of the invention.

FIGS. 6 and 7 show the essential advantages of the invention. These figures show a work station area whose floor is covered with slabs in accordance with the invention, and some of the slabs are shown with their lids removed.

Reference is made initially to FIG. 6, and it is assumed that when the work station area was initially wired a work table was to be provided in the middle of said area. One of the slabs 30 located approximately in the middle of the area was therefore fitted with a block 22 having one of its outlets connected to a cable 24. One of the advantages of the invention thus consists in being able to locate connection means at any point in an area. Thus, none of the connection cables running to the equipment being served by the connection means needs to run over the floor. At the slab 30, the length of cable connected to the corresponding outlet is not as short as possible, and the extra length is wound down in the form of several turns around the housing 17. As a result, if it subsequently becomes necessary to dispose the connection means at another location in the work area, e.g. at the location of a slab 31 or a slab 32, this can be done merely by removing the lid 3 from the slab 30, removing the block 22 from the housing 17 in said slab, removing the lids 2 from the slabs situated between the slabs 30 and 31 (or 32), removing the lid 2 from the slab 31 (or 32), placing the block 22 in the housing of the destination slab, and then closing it with the lid 3 which was previously used for the slab 30. Thereafter, the intermediate slabs are closed after the cables have been appropriately rearranged and the original slab 30 is closed using the lid 2 that previously closed the destination slab 31 (or 32). By working in this way, connection means can be transferred from one slab to another extremely quickly and no new equipment is required nor is it necessary to disconnect the cables from the connection means. This manipulation is extremely simple to perform and does not require the services of a wiring technician.

Reference is now made to FIG. 7 showing an advantageous method of wiring a work station area which is made possible by using slabs in accordance with the invention. Assume that two cables 27 and 28 are to be connected to respective connection means received in the block 22 of slab 30. One of the cables, e.g. dashed line cable 27 is a power cable and the other, e.g. solid line cable 28 is a computer cable. As mentioned above with reference to FIG. 6, each of the cables 27 and 28 is provided with a considerable amount of excess length which is wound down, but not in the housing of the slab 30. In order to avoid disturbances due to coupling which could occur if coils of the two cables 27 and 28 were superposed, they are wound down around respective empty housings in two different slabs 33 and 34 which are contiguous with the slab 30. As a result, the two cables 27 and 28 follow different paths and mutual interference is greatly reduced. Naturally, this wiring method may be applied to wiring more than two cables.

In addition to the above-mentioned advantages, a slab in accordance with the invention also has the advantages of:

being easy to lay and being equally suitable for protecting wiring in new premises as for rewiring old premises;

providing a large amount of empty space, thereby making it possible to receive and pass equipment other than the abovementioned cables (in particular piping for water, gas, compressed air, etc.); and being cheap, since it is advantageously fabricated by molding a plastic material.

Naturally, the top surface of each slab lid may be treated so as to be pleasant in appearance, or else it may be covered with a covering (e.g. carpet) for the same purposes.

The present invention is not limited to the embodiments described above. It is capable of being modified or altered by the person skilled in the art. In particular, although the slabs and housings shown are square in shape, they could be given some other shape, e.g. they could be hexagonal.

I claim:

1. A distribution slab for wiring buildings, the slab comprising a base and a lid, said base comprising a planar base plate from which there project:
   at least four spacers for supporting said lid and holding it away from the planar plate; and
   the sides of a connection housing, with at least one of said sides including an opening for passing cables, said connection housing being provided to receive connection means.

2. A distribution slab according to claim 1, wherein the connection housing contains a fixing block for the connection means.

3. A distribution slab according to claim 1, wherein the sides of the connection housing have the same height as the spacers.

4. A distribution slab according to claim 1, wherein the planar plate includes at least one spacer at each of its corners.

5. A distribution slab according to claim 1, including a stud in the middle of the connection housing for the purpose of supporting a fixing block for the connection means.

6. A distribution slab according to claim 1, wherein the planar plate includes a spacer in its center, said spacer being pierced by a bore for receiving the end of an anchor rod.

7. A distribution slab according to claim 1, wherein the connection housing is disposed in the center of the base plate.

8. A distribution slab according to claim 1, wherein the lid comprises a plate containing an opening having substantially the same area as the bottom of the housing and disposed vertically thereover.

9. A distribution slab according to claim 1, wherein its base also includes quick fastening means for fixing adjacent slabs together.

10. A distribution slab according to claim 1, which is rectangular in shape.

11. The distribution slab of claim 10 in which the slab is square.

12. A distribution slab according to claim 1, wherein the connection housing is rectangular.

13. The distribution slab of claim 12 in which the connection housing is square.

14. The distribution slab of claim 1 including a fixing block adapted to be received within said connection housing, for receiving the connection means.

15. The distribution slab of claim 14 in which said fixing block includes a retractable support frame for receiving the connection means, a flap for carrying the support frame, a junction body for joining the fixing block to said slab, and a hinge to movably connect the flap to the junction body.

16. A distribution slab according to claim 15, in which the support frame is a frame extending substantially perpendicularly to the flap and including at least one opening for receiving the connection means.

17. A distribution slab according to claim 15, in which said fixing block includes locking means for holding each said hatch in the open position or else in the closed position.

18. A distribution slab according to claim 17 in which said sides of said connection housing include inwardly directed lips at their top edges for holding said fixing block within said connection housing; in which the hinge is formed by a trough having a substantially V-shaped cross-section and tending to urge the flap resiliently away from the junction body, and in which the support frame includes at least one rib extending transversely to said frame and to the flap, with each rib delimiting a notch at each end for resiliently engaging the lip of one of the sides of the housing.

19. A distribution slab according to claim 15, in which said fixing block includes four hatches.

20. A distribution slab according to claim 15 in which said sides of said connection housing include inwardly directed lips at the top edges; in which said hinge is formed by a trough having a substantially V-shaped cross section and tending to urge said flap resiliently away from said junction body; and in which said support frame includes at least one rib extending perpendicularly to said frame and to said flap, said rib having a notch at each end for engaging one of said lips.

21. A method of wiring an assembly of hollow slabs each having an internal housing, and at least one slab including connection means adapted to connect to at least one wiring cable, the method comprising coiling each cable about the housing of a slab adjacent to the slab to which the cable is to be connected with each coil wound about a different housing until all such adjacent slabs have cables coiled about such housings, and cables coiled cooperatively thereafter, and then connecting each cable to the connection means.

* * * * *